(12) United States Patent
Eom et al.

(10) Patent No.: US 8,340,426 B2
(45) Date of Patent: Dec. 25, 2012

(54) APPARATUS AND METHOD FOR RECOGNIZING CHARACTERS

(75) Inventors: Ki-wan Eom, Suwon-si (KR); Jae-won Lee, Seoul (KR); Juno-eun Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 926 days.

(21) Appl. No.: 12/076,280

(22) Filed: Mar. 14, 2008

(65) Prior Publication Data
US 2009/0136135 A1 May 28, 2009

(30) Foreign Application Priority Data

Nov. 22, 2007 (KR) .................. 10-2007-0119873

(51) Int. Cl.
*G06K 9/00* (2006.01)
(52) U.S. Cl. .................................... 382/181; 345/660
(58) Field of Classification Search .......... 382/181–182; 345/660
See application file for complete search history.

(56) References Cited

U.S. PATENT DOCUMENTS

| | | | |
|---|---|---|---|
| 7,171,046 B2 | 1/2007 | Myers et al. | |
| 7,542,160 B2 * | 6/2009 | Parry et al. | 358/1.15 |
| 7,773,808 B2 * | 8/2010 | Lim et al. | 382/181 |
| 2003/0017844 A1 * | 1/2003 | Yu | 455/556 |
| 2003/0169923 A1 * | 9/2003 | Butterworth | 382/181 |
| 2004/0057619 A1 * | 3/2004 | Lim et al. | 382/182 |
| 2005/0193018 A1 * | 9/2005 | Rosdahl | 707/104.1 |
| 2005/0195221 A1 * | 9/2005 | Berger et al. | 345/660 |
| 2005/0221856 A1 * | 10/2005 | Hirano et al. | 455/557 |
| 2005/0259866 A1 | 11/2005 | Jacobs et al. | |
| 2005/0288932 A1 * | 12/2005 | Kurzweil et al. | 704/260 |
| 2007/0177183 A1 | 8/2007 | Robinson et al. | |

FOREIGN PATENT DOCUMENTS

| | | |
|---|---|---|
| KR | 10-0569194 | 4/2006 |
| KR | 10-2006-0046128 | 5/2006 |
| KR | 10-2006-0050746 | 5/2006 |
| KR | 10-0593986 | 6/2006 |
| KR | 10-0598416 | 7/2006 |
| KR | 10-0667156 | 1/2007 |
| KR | 10-0746755 | 7/2007 |

* cited by examiner

*Primary Examiner* — Hadi Akhavannik
(74) *Attorney, Agent, or Firm* — Staas & Halsey LLP

(57) ABSTRACT

Provided is an apparatus and method for recognizing characters. The apparatus includes a display unit to display an image in which a region of interest or an error region is indicated, and a character recognition result, a region-of-interest setting unit to set the region of interest in the image displayed on the display unit, a recognition unit to perform character recognition on the region of interest or the error region and provide the character recognition result to the display unit, and an error correction unit to set the error region in the image displayed on the display region, perform image copying on the set error region according to a user input, and provide a handwriting input using the image copying to the recognition unit.

18 Claims, 5 Drawing Sheets
(1 of 5 Drawing Sheet(s) Filed in Color)

APPARATUS AND METHOD FOR RECOGNIZING CHARACTERS

CROSS-REFERENCE TO RELATED PATENT APPLICATION

This application claims the benefit of Korean Patent Application No. 10-2007-0119873, filed on Nov. 22, 2007, in the Korean Intellectual Property Office, the disclosure of which is incorporated herein in its entirety by reference.

BACKGROUND OF THE INVENTION

1. Field of the Invention

The present invention generally relates to an apparatus and method for recognizing characters, and more particularly, to an apparatus and method for recognizing characters whereby a device having a photographing function recognizes a character included in a captured image and re-recognizes the character that is erroneously recognized after correcting the recognized character according to a user input.

2. Description of the Related Art

Existing character input methods used in mobile devices such as mobile phones include keypad input, character touch input, and handwriting input. Studies have been conducted in order for a mobile phone having a camera function to directly capture an image including a character of a direction board of a street or a character of a menu board of a restaurant, recognize the character, and provide information about the recognized character to a user, thereby allowing the user to know the meaning of the character even when the character is expressed in unfamiliar language.

In the case of handwriting input from among the character input methods, there are many variations in handwriting because the style and size of handwriting are different from user to user according to users' unique handwriting habits. As a result, it is difficult to guarantee stable recognition performance. In particular, a user has a difficulty in correctly inputting other unfamiliar languages, e.g., English, Chinese, Arabic, and Hebrew, than the native language, thus leading to further degradation in the performance of recognition of a user's handwriting input. In this regard, the performance of voice recognition of English words spoken by an English-speaking user degrades much more than the performance of voice recognition of English words spoken by a non-English speaking user.

On the other hand, recognition of a character included in an image captured by a camera is very useful in that such recognition does not require a user's keypad input or handwriting input. Character images can be easily obtained by a camera of a mobile device regardless of a medium on which target characters are recorded, such as a notice in a tourist resort, a signboard of a store, a menu board, or a name card. When a character included in a captured image is a print character, the character is less affected by influences from variations in handwriting input. However, good recognition performance cannot be guaranteed for a character in a graphic style, and since an environment where an image including a character is captured is not limited, a dull image may be obtained due to surrounding lighting or a photographing position or a blurry image may be obtained due to inaccurate focus control. Moreover, when character recognition is not performed accurately, the user has to experience the inconvenience of capturing an image including the same character again.

In the case of keypad input, the user cannot input an unfamiliar language or a non-native language for which input is not supported by a mobile device. Even when the mobile device supports input for such a language, the user may have a difficulty in thoroughly knowing a character input method for the unfamiliar language or the non-native language. In the case of handwriting input, recognition performance may degrade because a user's handwriting input for the unfamiliar language or the non-native language is not natural. Moreover, since additional image processing of handwriting input requires a large amount of computation, handwriting input cannot be actually applied to a mobile device having a cheap processor mounted therein.

SUMMARY OF THE INVENTION

The present invention provides an apparatus and method for recognizing characters whereby a device having a photographing function recognizes a character included in a captured image and re-recognizes the character that is erroneously recognized after correcting the recognized character according to a user input.

The present also invention provides an apparatus and method for recognizing characters whereby a device having a photographing function recognizes a character included in a captured image after correcting the character according to a user input.

According to an aspect of the present invention, there is provided an apparatus for recognizing characters. The apparatus includes a display unit, a region-of-interest setting unit, a recognition unit, and an error correction unit. The display unit displays an image in which a region of interest or an error region is indicated, and a character recognition result. The region-of-interest setting unit sets the region of interest in the image displayed on the display unit. The recognition unit performs character recognition on the region of interest or the error region and provides the character recognition result to the display unit. The error correction unit sets the error region in the image displayed on the display region, performs image copying on the set error region according to a user input, and provides a handwriting input using the image copying to the recognition unit.

According to another aspect of the present invention, there is provided a method of recognizing characters. The method includes displaying an image including a character, setting a region of interest in the displayed image, performing character recognition on the set region of interest and displaying a character recognition result, setting an error region according to the character recognition result, performing image copying according to a user input in order to correct an error of a character included in the set error region, and performing character recognition on a handwriting input using the image copying and displaying a character recognition result.

According to another aspect of the present invention, there is provided an apparatus for recognizing characters. The apparatus includes a display unit, a recognition unit, a region-of-interest setting unit, and an error correction unit. The display unit displays an image in which a region of interest is set, and a character recognition result. The recognition unit performs character recognition on the region of interest or the error region and provides the character recognition result to the display unit. The region-of-interest sets unit setting the region of interest in the image displayed on the display unit. The error correction unit performs image copying on the set region of interest according to a user input and provides a handwriting input using the image copying to the recognition unit.

According to another aspect of the present invention, there is provided a method of recognizing characters. The method includes displaying an image including a character, setting a region of interest in the displayed image, performing image copying on the set region of interest according to a user input, and performing character recognition on a handwriting input using the image copying and displaying a character recognition result.

The method may be implemented with a computer-readable recording medium having recorded thereon a program for executing the method on a computer.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other features and advantages of the present invention will become more apparent by describing in detail embodiments thereof with reference to the attached drawings in which.

DETAILED DESCRIPTION OF THE INVENTION

Figure 1:
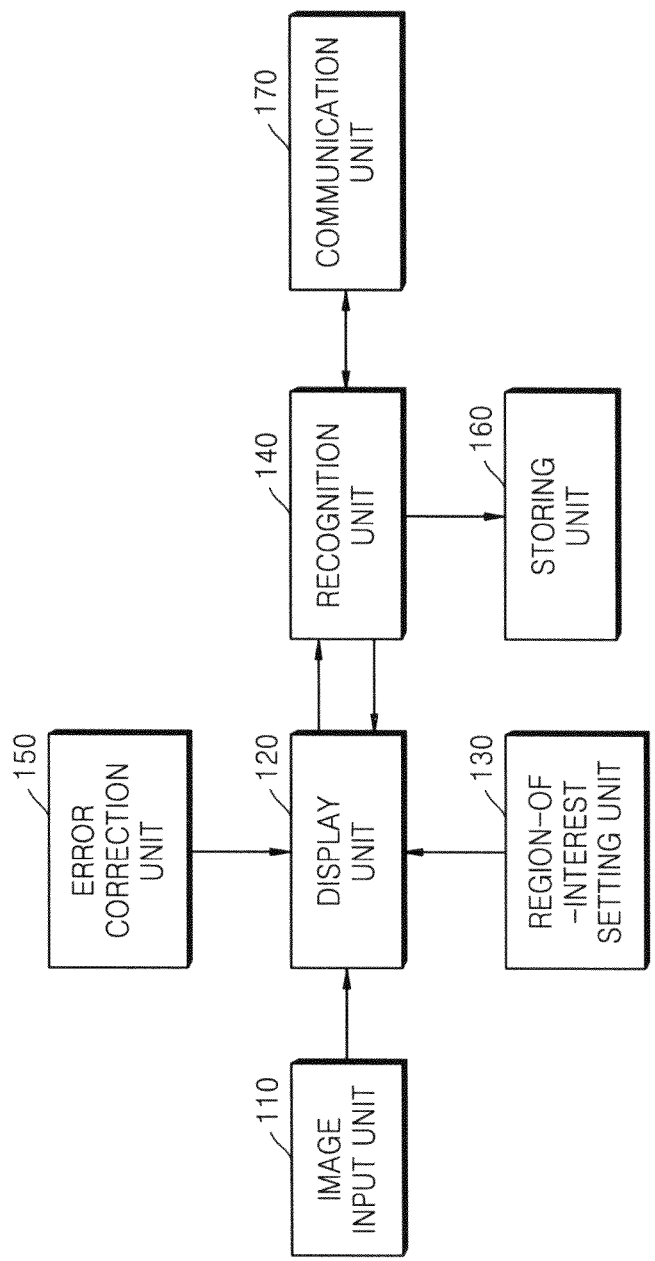
FIG. 1 is a block diagram of an apparatus for recognizing characters according to an embodiment of the present invention.

Hereinafter, embodiments of the present invention will be described in detail with reference to the accompanying drawings. It should be noted that like reference numerals refer to like elements illustrated in one or more of the drawings. In the following description of the present invention, detailed description of known functions and configurations incorporated herein will be omitted for conciseness and clarity.

FIG. 1 is a block diagram of an apparatus for recognizing characters according to an embodiment of the present invention. Referring to FIG. 1, the apparatus includes an image input unit 110, a display unit 120, a region-of-interest setting unit 130, a recognition unit 140, and an error correction unit 150. The apparatus may further optionally include a storing unit 160 and/or a communication unit 170. Although not shown in FIG. 1, a keypad input unit and a common direct handwriting input unit may also be included in the apparatus. The direct handwriting input unit may include the display unit 120 in which a predetermined input region is set and an input device such as an electronic pen. However, when the input region is not set in the display unit 120, the entire region of the display unit 120 may be regarded as the input region.

Referring to FIG. 1, the image input unit 110 inputs therein an image captured by a camera included in a mobile device, the image including a character. According to another embodiment of the present invention, the image input unit 110 may input therein an image including a character, which is transmitted from an external device or is stored in the mobile device.

The display unit 120 displays the image including the character, which is input through the image input unit 110, on a liquid crystal screen of the mobile device, or displays a character recognition and search result obtained by the recognition unit 140 on the liquid crystal screen.

The region-of-interest setting unit 130 sets a region of interest, i.e., a character region, in the image displayed on the display unit 120 according to a user input. A user may set the region of interest in the liquid crystal screen using an electronic pen such as a touch-screen stylus pen. The set region of interest is provided to the recognition unit 140.

The recognition unit 140 performs character recognition on the region of interest set by the region-of-interest setting unit 130 or performs character recognition on an error region set by the error correction unit 150. Character recognition may be performed using an embedded recognition program. To this end, various well-known methods may also be used. For example, character recognition may be performed using an optical character reader (OCR) program which implements the principle of an OCR for recognizing and reading a character by detecting the intensity of, i.e., the quantitative difference of light irradiated to and reflected from a print or an image. When the region-of-interest setting unit 130 is not included in the apparatus, the recognition unit 140 detects the character region from the image displayed on the display unit 120 and performs character recognition on the detected character region. When the recognition unit 140 has a character dictionary as a database, it searches for the recognized character in the character dictionary and provides found information to the display unit 120. When the recognition unit 140 does not have a character dictionary, it provides the recognized character to a previously linked web server (not shown) through the communication unit 170 and receives information obtained by web search through the communication unit 170 in order to provide the information to the display unit 120. According to another embodiment of the present invention, the recognition unit 140 provides the region of interest set by the region-of-interest setting unit 130 or the error region set by the error correction unit 150 to the web server through the communication unit 170, and the web server performs character recognition and search on the set region of interest or the set error region and provides found information to the display unit 120 through the recognition unit 140.

When a character recognition error, i.e., information indicating that there is no search result, or wrong information, is displayed on the display unit 120, the error correction unit 150 corrects an error according to a user input. More specifically, when the character recognition error is displayed on the display unit 120, the error correction unit 150 sets an error region according to a user input and enlarges the set error region. Like in the region-of-interest setting unit 130, the user may set the error region on the liquid crystal screen using the electronic pen. Once the error region set according to the user input is enlarged and displayed on the display unit 120, the error correction unit 150 generates a user input using image copying with respect to the enlarged error region and provides the generated user input to the recognition unit 140. Similarly, for image copying for which the user writes the same character as a character included in the error region over the character, the user may use the electronic pen. According to another embodiment of the present invention, the error correction unit 150 uses at least two of image copying, keypad input, and handwriting input as error correction methods and corrects an error using an error correction method selected according to a user input.

The storing unit 160 stores information corresponding to the recognized character provided by the recognition unit 140 automatically or according to a user selection.

The communication unit 170 provides the recognized character provided by the recognition unit 140 to the web server or receives information corresponding to the recognized character from the web server in order to provide the received information to the recognition unit 140.

According to an embodiment of the present invention, character recognition is primarily performed on an image captured by a camera mounted in a mobile device and character recognition is secondarily performed after an erroneous character is corrected using image copying, thereby allowing accurate error correction and thus improving recognition performance. Consequently, superior search performance can be guaranteed when a recognized character is used as a query word in a search.

Figure 2:
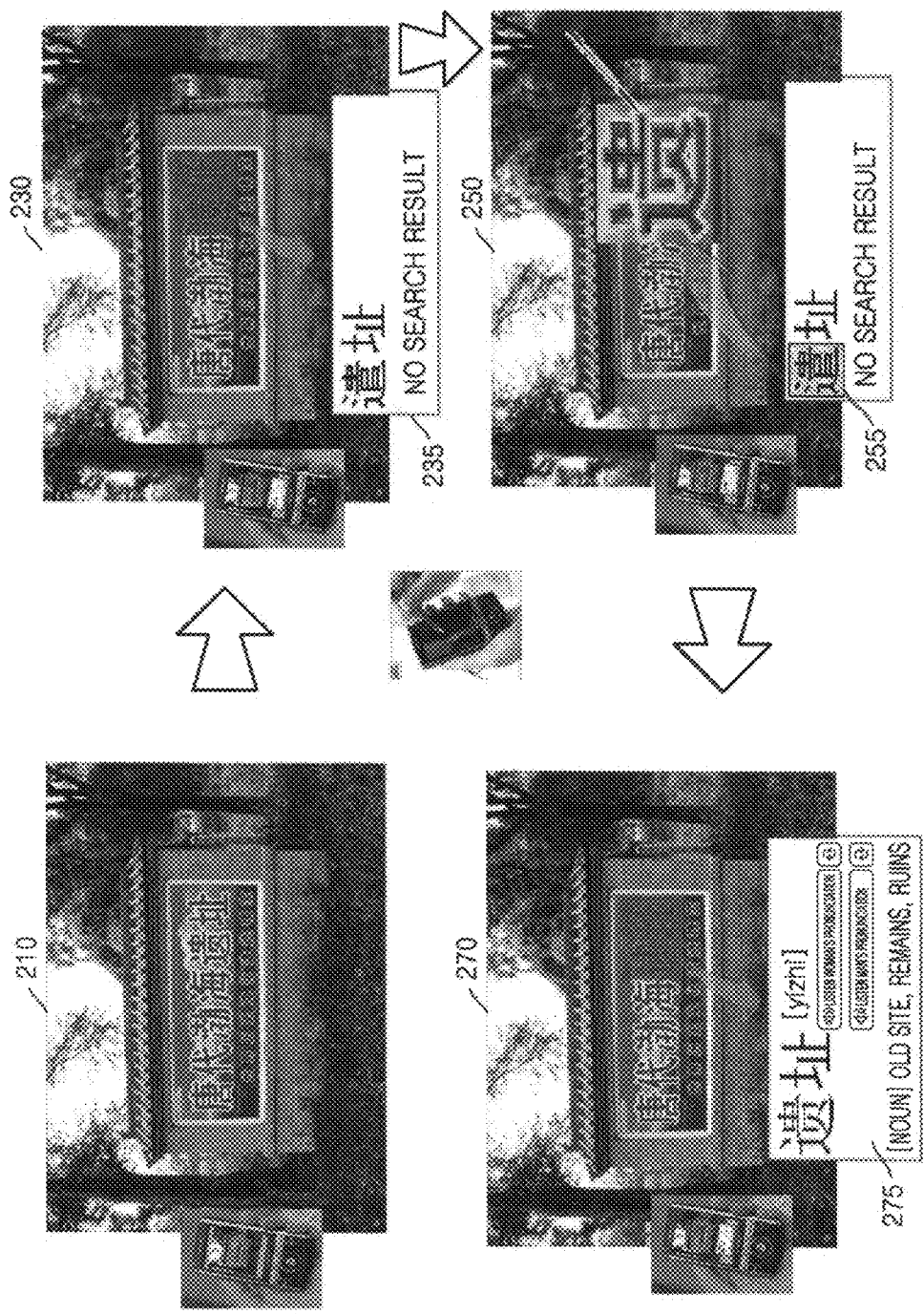
FIG. 2 schematically illustrates information displayed on a display unit according to operation results of components illustrated in FIG. 1.

FIG. 2 schematically illustrates information displayed on the display unit 120 according to operation results of components illustrated in FIG. 1. In FIG. 2, an image including a notice a user can see in a tourist resort is captured as an example. Reference numeral 210 refers to a captured image provided by the image input unit 110. The image 210 includes a region of interest. Reference numeral 230 refers to an image that is displayed on the display unit 120 after the recognition unit 140 performs character recognition and search. The image 230 includes a region 235 showing a character recognition and search result. Reference numeral 250 refers to an image displayed on the display unit 120. In the image 250, an error region 255 set by the error correction unit 150 is enlarged. Reference numeral 270 refers to an image displayed on the display unit 120 after the recognition unit 140 performs character recognition and search if image copying with respect to the enlarged error region as a user input is provided to the recognition unit 140. The image 270 includes a region 275 showing a character recognition and search result.

Figure 3:
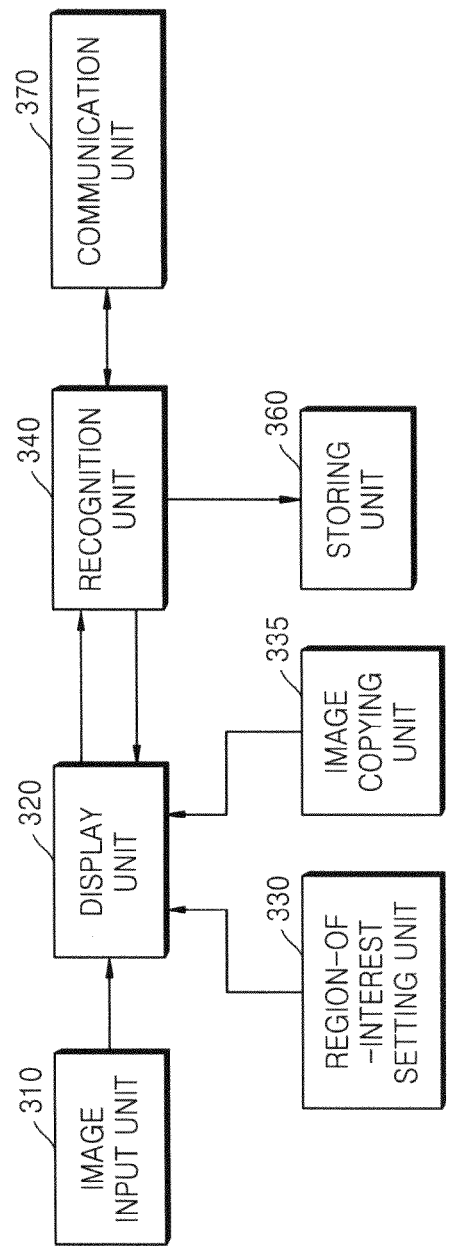
FIG. 3 is a block diagram of an apparatus for recognizing characters according to another embodiment of the present invention.

FIG. 3 is a block diagram of an apparatus for recognizing characters according to another embodiment of the present invention. Referring to FIG. 3, the apparatus includes an image input unit 310, a display unit 320, a region-of-interest setting unit 330, an image copying unit 335, and a recognition unit 340. The apparatus may further optionally include a storing unit 360 and a communication unit 370. Although not shown in FIG. 3, a keypad input unit and a common direct handwriting input unit may also be included in the apparatus. The image input unit 310, the display unit 320, the storing unit 360, and the communication unit 370 function in the same manner as those illustrated in FIG. 1 and thus will not be described in detail.

Referring to FIG. 3, the region-of-interest setting unit 330 sets a region of interest, i.e., a character region, in an image displayed on the display unit 320 according to a user input, enlarges the set region of interest, and provides the enlarged region of interest to the display unit 320.

Once the region of interest set according to the user input is enlarged and displayed on the display unit 320, the image copying unit 335 generates a user input using image copying with respect to the enlarged region of interest and provides the generated user input to the recognition unit 340.

The recognition unit 340 performs character recognition on the region of interest input from the image copying unit 335 and performs the same operation as that performed by the recognition unit 140 illustrated in FIG. 1.

According to another embodiment of the present invention, character recognition is performed on a character included in a region of interest after correction of the character using image copying, thereby reducing error occurrence and processing time.

Figure 4:
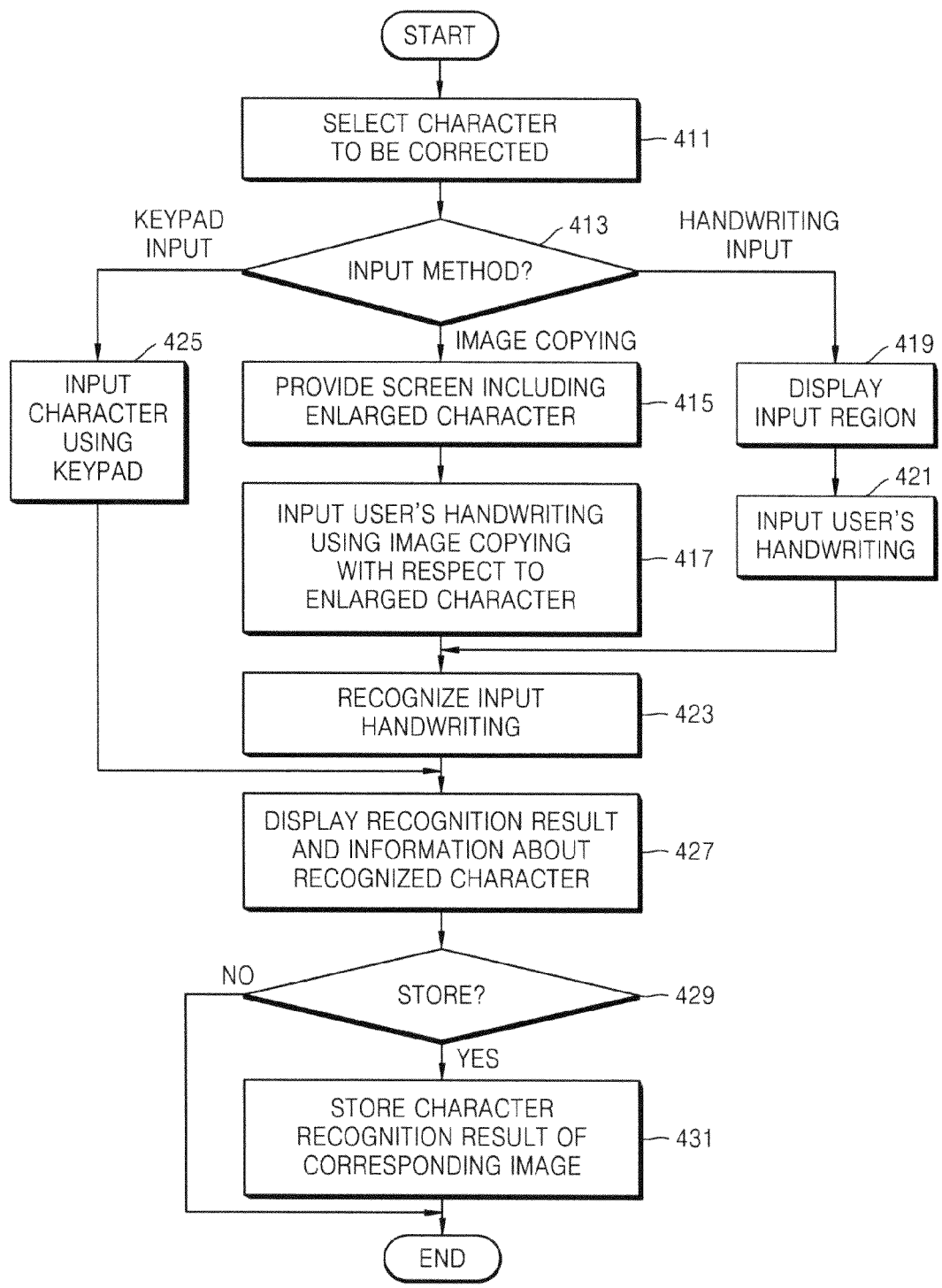
FIG. 4 is a flowchart illustrating an operation of an error correction unit illustrated in FIG. 1.

FIG. 4 is a flowchart illustrating a method of recognizing characters according to an embodiment of the present invention.

Referring to FIG. 4, in operation 411, a user selects an error region, i.e., a character to be corrected, by referring to a character recognition and search result displayed on the display unit 120.

In operation 413, the user selects an error correction method, i.e., an input method, from among keypad input, image copying, and handwriting input.

If the user selects image copying as an error correction method in operation 413, the error correction unit 150 enlarges the selected character and provides a screen including the enlarged character to the user through the display unit 120 in operation 415.

In operation 417, if the user performs image copying on the enlarged character, the error correction unit 150 provides handwriting input corresponding to image copying to the recognition unit 140.

If the user selects handwriting input as an error correction method in operation 413, an input region is displayed on the display unit 120. More specifically, the user may perform handwriting input in an arbitrary region of the display unit 120, but an input region for handwriting input may be displayed on a separate region such as a lower portion of the display unit 120. In operation 421, the user inputs handwriting through a direct handwriting input unit (not shown). In operation 423, the recognition unit 140 recognizes user's handwriting that is input in operation 417 or 421.

If the user selects keypad input as an error correction method in operation 413, a character is input through a keypad input unit (not shown) in operation 425. Character recognition may be performed simultaneously with character input through the keypad input unit.

In operation 427, the result of character recognition performed on the error region and information about the recognized character, e.g., meaning information or search information, which are obtained in operation 423 or 425, are displayed on the display unit 120.

In operation 429, it is determined whether to store the information about the recognized character. If it is determined to store the information about the recognized character, the result of character recognition of a corresponding image is stored in the storing unit 160 in operation 431.

Figure 5:
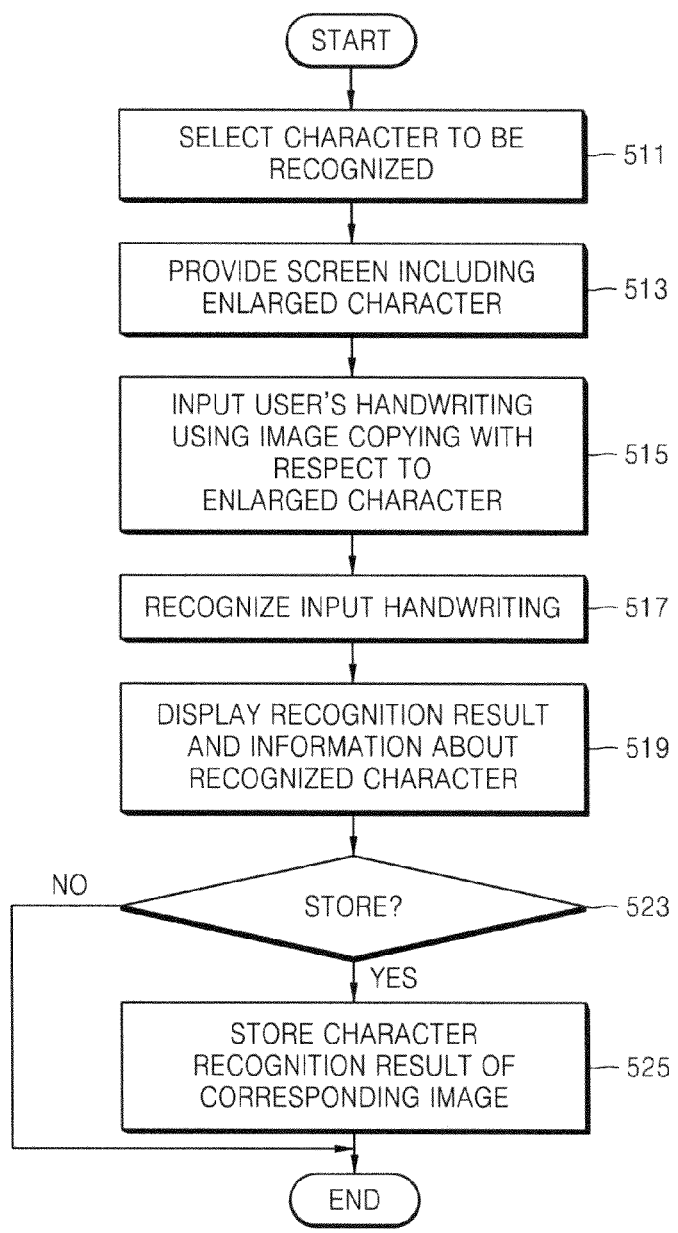
FIG. 5 is a flowchart illustrating operations of a region-of-interest setting unit and an image copying unit that are illustrated in FIG. 3.

FIG. 5 is a flowchart illustrating a method of recognizing characters according to another embodiment of the present invention.

Referring to FIG. 5, in operation 511, a user selects a region of interest, i.e., a character to be recognized, from an image displayed on the display unit 320.

In operation 513, the region-of-interest setting unit 330 enlarges a character included in the region-of-interest selected by the user in operation 511 and provides a screen including the enlarged character to the user through the display unit 320.

In operation 515, once the user performs image copying on the enlarged character, the image copying unit 335 provides a handwriting input corresponding to user's image copying to the recognition unit 340.

In operation 517, the recognition unit 340 recognizes user's handwriting input in operation 515.

In operation 519, the result of character recognition performed on the region of interest and information about the recognized character, e.g., meaning information or search information, which are obtained in operation 517, are displayed on the display unit 320.

In operation 523, it is determined whether to store the information about the recognized character. If it is determined to store the information about the recognized character, the result of character recognition of a corresponding image is stored in the storing unit 360 in operation 525.

As described above, according to embodiments of the present invention, character recognition is primarily performed on an image captured by a camera mounted in a mobile device and character recognition is secondarily performed after an erroneous character is corrected using image copying, thereby allowing accurate error correction and thus improving recognition performance. Consequently, superior search performance can be guaranteed when a recognized character is used as a query word in a search. Moreover, character recognition is performed on a character included in a region of interest after correction of the character using image copying, thereby reducing error occurrence and processing time.

Embodiments of the present invention can be embodied as a computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over network of coupled computer systems so that the computer-readable code is stored and executed in a decentralized fashion. Also, functional programs, code, and code segments for implementing the present invention can be easily construed by programmers skilled in the art.

While the present invention has been particularly shown and described with reference to embodiments thereof, it will be understood by one of ordinary skill in the art that various changes in form and detail may be made therein without departing from the spirit and scope of the present invention as defined by the following claims. Accordingly, the disclosed embodiments should be considered in a descriptive sense not in a restrictive sense. The scope of the present invention will be defined by the appended claims, and differences within the scope should be construed to be included in the present invention.

What is claimed is:

1. An apparatus for recognizing characters, the apparatus comprising:
 a display unit to display an image in which a region of interest or an error region is indicated, and a character recognition result;
 a region-of-interest setting unit to set the region of interest in the image displayed on the display unit;
 a recognition unit to perform character recognition on the region of interest or the error region and to provide the character recognition result to the display unit; and
 an error correction unit to set the error region in the image displayed on the display region, perform image copying on the set error region according to a user input, and provide a handwriting input using the image copying to the recognition unit,
 wherein the recognition unit provides information corresponding to the character recognition result to the display unit by searching and obtaining information corresponding to a recognized character in a dictionary included in a mobile device, and
 wherein the recognition unit performs a search using the character recognition result as a query word in the search after character recognition is performed on the error region, and provides the search result to the display unit.

2. The apparatus of claim 1, wherein when the error correction unit sets the error region, the error correction unit enlarges the set error region, provides the enlarged error region to the display unit, and performs image copying on the enlarged error region.

3. The apparatus of claim 1, wherein the error correction unit performs character input on the error region using keypad input or direct handwriting input as well as handwriting input using the image copying according to a user selection.

4. The apparatus of claim 1, wherein the display unit, the region-of-interest setting unit, the recognition unit, and the error correction unit are integrated into a mobile device.

5. An apparatus for recognizing characters, the apparatus comprising:
 a display unit to display an image in which a region of interest is set, and a character recognition result;
 a recognition unit to perform character recognition on the region of interest or the error region and to provide the character recognition result to the display unit;
 a region-of-interest setting unit to set the region of interest in the image displayed on the display unit; and
 an error correction unit to perform image copying on the set region of interest according to a user input and provide a handwriting input using the image copying to the recognition unit,
 wherein the recognition unit provides information corresponding to the character recognition result to the display unit by searching and obtaining information corresponding to a recognized character in a dictionary included in a mobile device, and
 wherein the recognition unit performs a search using the character recognition result as a query word in the search after character recognition is performed on the error region, and provides the search result to the display unit.

6. The apparatus of claim 5, wherein when the region-of-interest setting unit sets the region of interest, the image copying unit enlarges the set region of interest, provides the enlarged region of interest to the display unit, and performs image copying on the enlarged region of interest.

7. The apparatus of claim 5, wherein the display unit, the region-of-interest setting unit, the recognition unit, and the image copying unit are integrated into a mobile device.

8. A method of recognizing characters, the method comprising:
 displaying an image including a character;
 setting a region of interest in the displayed image;
 performing character recognition on the set region of interest and displaying a character recognition result;
 setting an error region according to the character recognition result;
 performing image copying according to a user input to correct an error of a character included in the set error region; and
 performing character recognition on a handwriting input using the image copying and displaying a character recognition result,
 wherein the displaying of the character recognition result comprises providing information obtained by searching for a recognized character in a dictionary included in a mobile device as the character recognition result, and
 performing a search using the character recognition result as a query word in the search after character recognition is performed on the handwriting input, and providing the search result to a display unit.

9. The method of claim 8, wherein the setting of the error region comprises, when the error region is set, enlarging the set error region and displaying the enlarged error region, and the performing of the image copying comprises performing image copying on a character included in the enlarged error region.

10. The method of claim 8, further comprising:
performing keypad input to correct an error of a character included in the set error region;
performing direct handwriting input to correct the error of the character included in the set region; and
selecting one of handwriting input using the image copying, the keypad input, and the direct handwriting input as an error correction method according to a user selection.

11. The method of claim 8, wherein the character recognition is performed using an optical character reader (OCR) program.

12. The method of claim 8, wherein the region of interest or the error region is set using an electronic pen.

13. A method of recognizing characters, the method comprising:
displaying an image including a character;
setting a region of interest in the displayed image;
performing image copying on the set region of interest according to a user input; and
performing character recognition on a handwriting input using the image copying and displaying a character recognition result,
wherein the displaying of the character recognition result comprises providing information obtained by searching for a recognized character in a dictionary included in a mobile device as the character recognition result, and
performing a search using the character recognition result as a query word in the search after character recognition is performed on the handwriting input, and providing the search result to a display unit.

14. The method of claim 13, wherein the setting of the region of interest comprises, when the region of interest is set, enlarging the set region of interest and displaying the enlarged region of interest, and the performing of the image copying comprises performing image copying on a character included in the enlarged region of interest.

15. The method of claim 13, wherein the character recognition is performed using an optical character reader (OCR) program.

16. The method of claim 13, wherein the region of interest is set using an electronic pen.

17. The apparatus of claim 1, further comprising a storing unit to automatically store information corresponding to the recognized character provided by the recognition unit.

18. The method of claim 8, further comprising automatically storing the obtained information corresponding to the recognized character.

\* \* \* \* \*